US008582805B2

(12) United States Patent
Monacos et al.

(10) Patent No.: US 8,582,805 B2
(45) Date of Patent: Nov. 12, 2013

(54) SYNTHETIC FOVEAL IMAGING TECHNOLOGY

(75) Inventors: Steve P. Monacos, Altadena, CA (US); Michael E. Hoenk, Valencia, CA (US); Shouleh Nikzad, Valencia, CA (US)

(73) Assignee: California Institute of Technology, Pasadena, CA (US)

( * ) Notice: Subject to any disclaimer, the term of this patent is extended or adjusted under 35 U.S.C. 154(b) by 1091 days.

(21) Appl. No.: 12/265,387

(22) Filed: Nov. 5, 2008

(65) Prior Publication Data
US 2009/0116688 A1  May 7, 2009

Related U.S. Application Data

(60) Provisional application No. 61/002,017, filed on Nov. 5, 2007.

(51) Int. Cl.
*G06K 9/00* (2006.01)
*H04N 7/18* (2006.01)
*H04N 5/225* (2006.01)

(52) U.S. Cl.
USPC .......... 382/103; 348/159; 348/169; 348/218.1

(58) Field of Classification Search
USPC ............................................. 382/103
See application file for complete search history.

(56) References Cited

U.S. PATENT DOCUMENTS

| 4,952,809 A * | 8/1990 | McEwen ................. 250/342 |
| 6,552,744 B2 * | 4/2003 | Chen ...................... 348/218.1 |
| 7,015,954 B1 * | 3/2006 | Foote et al. ............. 348/218.1 |
| 7,082,572 B2 * | 7/2006 | Pea et al. ................ 715/720 |
| 7,215,364 B2 * | 5/2007 | Wachtel et al. ......... 348/218.1 |
| 7,965,314 B1 * | 6/2011 | Miller et al. ............ 348/164 |
| 2006/0023217 A1 * | 2/2006 | Bangalore et al. ...... 356/418 |
| 2006/0125921 A1 * | 6/2006 | Foote ...................... 348/159 |
| 2007/0103543 A1 * | 5/2007 | Anderson et al. ....... 348/36 |
| 2007/0115352 A1 * | 5/2007 | Oskiper et al. ......... 348/44 |
| 2007/0279494 A1 * | 12/2007 | Aman et al. ............. 348/169 |
| 2009/0058988 A1 * | 3/2009 | Strzempko et al. ..... 348/36 |

OTHER PUBLICATIONS

Vincze, On the design and structure of artificial eyes for tracking tasks, in Second IEEE International Conference on Computational Cybernetics (ICCC2004), Aug. 30-Sep. 1, 2004, pp. 135-142.*

* cited by examiner

*Primary Examiner* — David Zarka
(74) *Attorney, Agent, or Firm* — Canady & Lortz LLP; Bradley K. Lortz (57) ABSTRACT

Apparatuses and methods are disclosed that create a synthetic fovea in order to identify and highlight interesting portions of an image for further processing and rapid response. Synthetic foveal imaging implements a parallel processing architecture that uses reprogrammable logic to implement embedded, distributed, real-time foveal image processing from different sensor types while simultaneously allowing for lossless storage and retrieval of raw image data. Real-time, distributed, adaptive processing of multi-tap image sensors with coordinated processing hardware used for each output tap is enabled. In mosaic focal planes, a parallel-processing network can be implemented that treats the mosaic focal plane as a single ensemble rather than a set of isolated sensors. Various applications are enabled for imaging and robotic vision where processing and responding to enormous amounts of data quickly and efficiently is important.

22 Claims, 8 Drawing Sheets

SYNTHETIC FOVEAL IMAGING TECHNOLOGY

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 61/002,017, filed Nov. 5, 2007, and entitled "SYNTHETIC FOVEAL IMAGING TECHNOLOGY," by Monacos et al.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

This invention relates to image data processing. Particularly, this invention relates to image data processing for automated recognition and sensor control on space platforms.

2. Description of the Related Art

Gigapixel mosaic focal planes have been proposed for very wide field-of-view (VWFOV) imaging with high resolution at the region of interest (ROI) level to detect and track sparse events within the VWFOV. In order to capture such events using a gigapixel focal plane array without dynamic adaptation, immense volumes of data need to be post processed to identify and track such events through an image data space, e.g. consisting of terabytes of data. This methodology is not only time consuming but may also result in missing significant events that require real-lime adaptation of the focal plane array (e.g. pointing, focal plane operating conditions) to observe the phenomena with the required level of fidelity.

Imaging for intelligence/surveillance (e.g., from spacecraft) is typically directed to collecting data from space on observable phenomena of potential intelligence value occurring anywhere on earth and at anytime. In addition, it may involve processing the collected data into information and communicating and disseminating that information as actionable intelligence. Such intelligence data is often dominated by high-resolution imagery due to the emergence of large format digital cameras and can create a tactical advantage through rapid dissemination. However, one limitation is that data link bandwidths from sensor platforms in space are limited to hundreds of megabits per second. Given the extended distances required for such links, there is no near term solution to realizing a data link or network technology that can reasonably match the rate at which large format digital cameras collect data. This problem may be further exacerbated with sensor technologies that move into the realm of gigapixel imagery.

Thus, a primary challenge in realizing a gigapixel sensor capable of in-situ situational awareness is the need for on-the-fly automated processing of large volumes of streaming data with native intelligence to filter the raw data and update the sensor state to focus on the truly useful data within the scene. Due to data link bandwidth constraints, a lack of in-situ intelligence will result in low-to-medium resolution imagery or reduced acquisition rates and resultant limits on detection and recognition capabilities.

A new approach is required to create the possibility of real time perception, and recognition that include identification, tracking, and response to multiple moving targets. This paradigm requires converting the processed results into meaningful sensor control information in real time to keep pace with changes in the scene imagery by eliminating data having little informational value and retaining only data with pertinent information. The challenge of such an adaptive mechanism is not only on-the-fly processing but also system-level coordination for rapidly turning around the results to achieve dramatic data reduction and a reduced computational load.

Some current technologies offer real-time processing of data using parallel computational environments running on general purpose multi-processors, e.g., Parallel Computational Environment for Imaging Science (PiCEIS), or operator-controlled foveation within a gigapixel array camera for manual target tracking, e.g., ResoLUT gigapixel camera. PiCEIS is an image processing package designed for efficient execution on massively parallel computers and has demonstrated 10-second processing time for very large image files. ResoLUT is a gigaPixel surveillance camera with selective foveation. However, the PiCEIS environment requires massive bandwidth from the sensor to the mainframe system to achieve the image processing time reported for this work and the ResoLUT camera has the low-level control built into the camera to provide for on-the-fly adaptation of the camera but lacks integrated processing and control needed to update the camera operational state based on image dynamics. Such existing conventional systems are limited to a resolution of one gigapixel and require back end processing and direct user control to operate. Additionally, current systems are designed to accept and process data from at most two imagers for stereoscopic applications and lack the scalability for multi-gigapixel mosaic focal plane arrays.

In view of the foregoing, there is a need in the art for apparatuses and methods for high volume image data processing. There is a need for such apparatuses and methods for long-range surveillance applications due to their high spatial resolution and wide field-of-view. There is a need for such systems and methods for automated image recognition and sensor control. There is particularly a need for such apparatuses on space platforms due to limited data link bandwidths for remote recognition and control. These and other needs are met by the present invention as detailed hereafter.

SUMMARY OF THE INVENTION

Apparatuses and methods are disclosed that create a synthetic fovea in order to identify and highlight interesting portions of an image for further processing and rapid response. Synthetic foveal imaging provides a parallel processing architecture that can use reprogrammable logic to implement embedded, distributed, real-time foveal image processing from different sensor types while simultaneously allowing for lossless storage and retrieval of raw image data. Real-time, distributed, adaptive processing of multi-tap image sensors with coordinated processing hardware used for each output tap is enabled. In mosaic focal planes, a parallel-processing network can be implemented that treats the mosaic focal plane as a single ensemble rather than a set of isolated sensors. Various applications are enabled for imaging and robotic vision where processing and responding to enormous amounts of data quickly and efficiently is important.

As discussed above, current technologies for handling gigapixel imagery fall into two basic categories, real-time processing using general purpose multi-processing such as PiCEIS and manual target tracking using operator-controlled foveation with a gigapixel array camera such as ResoLUT. However, these approaches lack the integrated processing and control needed to update the camera operational state based on image dynamics and require massive bandwidth for backend processing for real-time multi-target tracking. Embodiments of the invention resolve these deficiencies with embedded processing and feedback control to locally identify and track targets of interest as the scene evolves and is a paradigm not supported by these competing approaches.

A typical apparatus for image processing comprises a plurality of smart imager cell (SIC) modules for receiving and foveal processing of image data, the plurality of smart imager cell modules interconnected to each other to share the foveal processing of the image data. Each of the plurality of SIC modules comprises one or more processors for detecting and tracking features in regions of interest within at least a portion of the image data and routing this portion of the image data to and from one or more interconnected adjacent SIC modules, and a local host interface for transferring this portion of the image data to data storage.

In some embodiments of the invention, the plurality of SIC modules may be interconnected in a two dimensional network. The two dimensional network may comprise the plurality of SIC module interconnected in a plurality of rows and a plurality of columns.

In some embodiments of the invention, the image data may be generated from a focal plane array (FPA) where each of the plurality of SIC modules comprises an FPA imager generating at least a portion of the image data. Detecting and tracking features in regions of interest within a portion of the image data may comprise generating markers for detected features within a portion of the image data and the markers are transferred to the data storage. In addition, the one or more processors may control the FPA imager for each of the plurality of SIC modules in response to the detecting and tracking of features in regions of interest within a portion of the image data. In some embodiments, at least one of the plurality of SIC modules may comprise a different type FPA imager from the others, e.g. a heterogeneous mix of FPA imagers may be used.

In further embodiments of the invention, the plurality of SIC modules may be programmable receiving input parameters through the local host interface for directing control of one or more processors. The input parameters may direct detecting and tracking of features in the regions of interest within a portion of the image data. The one or more processors may typically comprise one or more field programmable gate arrays (FPGAs).

In a similar manner, a typical method embodiment of the invention for image processing, comprises receiving image data at a plurality of SIC modules, foveal processing of image data with the plurality of SIC modules where each of the plurality of SIC modules comprises one or more processors for detecting and tracking features in regions of interest within at least a portion of the image data, sharing the foveal processing of the image data with the plurality of SIC modules where each of the plurality of SIC modules routes a portion of the image data to and from one or more interconnected adjacent SIC modules, and transferring a portion of the image data to data storage through a local host interface for each of the plurality of SIC modules. Method embodiments of the invention may be further modified consistent with the apparatuses and systems described herein.

In another embodiment of the invention, an apparatus may comprise a plurality of SIC modules receiving and foveal processing of image data, the plurality of smart imager cell modules interconnected to each other to share the foveal processing of the image data. Each of the plurality of SIC modules comprise a processing means for detecting and tracking features in regions of interest within at least a portion of the image data, a routing means for transferring at least a portion of the image data to and from one or more interconnected adjacent SIC modules, and a local host interface means for transferring at least a portion of the image data to a data storage means for storing at least a portion of the image data. The image data may be generated from a focal plane array (FPA) where each of the plurality of SIC modules comprises an FPA imager means for generating at least a portion of the image data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the invention are directed to apparatuses and methods that create a synthetic fovea in order to identify and highlight interesting portions of an image for further processing and rapid response. Unlike its biological analog, the synthetic fovea is not restricted to one contiguous region in the image. To accomplish this objective, synthetic foveal imaging provides a parallel-processing architecture that can use reprogrammable logic to implement embedded, distributed, real-time foveal image processing from different sensor types while simultaneously allowing for lossless storage and retrieval of raw pixel data.

Synthetic foveal imaging directly addresses a key technology gap faced by future applications that employ ultrahigh resolution focal planes for imaging and robotic vision—the problem of processing and responding to enormous amounts of data quickly and efficiently. A key new feature of synthetic foveal imaging that addresses this technology gap is the capability for real-time, distributed, adaptive processing of multi-tap image sensors with coordinated processing hardware used for each output tap, which represents a significant advance over computation-intensive software based on brute-force methods of image collection and analysis. The synthetic foveal imaging architecture is especially powerful in mosaic focal planes, where it creates a parallel-processing network that treats the mosaic focal plane as a single ensemble rather than a set of isolated sensors. In contrast, no conventional system exists to handle an arbitrarily sized mosaic array of homogeneous or heterogeneous sensors (imagers) in a coordinated autonomous fashion.

In order to avoid post processing immense volumes of data from a gigapixel mosaic focal plane, a real-time processing system is required that can detect significant regions of interest, track them across the mosaic focal plane over time, mark the locations of these regions with the raw image data and provide the raw image data for these regions with markers back to the user/application for evaluation. Embodiments of the present invention offer this solution by embedding image processing algorithms in to a distributed control architecture used to read raw image data from the sensors of a mosaic focal plane. Each output tap of the mosaic focal plane can be processed as the image data is read out from the focal plane array (FPA) imager (or sensor) to scan for parameters that fit identified features of interest. By embedding the processing algorithms into reprogrammable hardware, as much processing parallelism can be built into each output data path as needed to process the data in real time for detection of require features in regions of interest. Parallel processing has been used previously for an eye tracking system to accelerate performance by greater than an order of magnitude compared with serial processing. Additionally, by networking the distributed controllers with embedded processing algorithms, sharing of detected features across the mosaic focal plane can be used to achieve a higher level of artificial intelligence for synthetic foveal capability for embodiments of the invention. The synthetic foveal paradigm of embodiments of the invention can also be used for an individual sensor with multiple output taps by using dedicated processing circuitry for each output to achieve high throughput with real time processing for feature detection and processing.

Typical embodiments of the invention define a novel computational construct comprising a group of smart imager cell (SIC) modules, where each SIC may include a focal plane array (FPA) imager and the required electronics for control and data readout of the FPA imager. The SIC modules are interconnected to form a scalable, tiled mosaic fabric with gigapixel resolution and coordination throughout the mosaic via the SIC interconnections.

Embodiments of the invention can additionally provide the versatility to handle any suitable imagers, e.g., both CCD and CMOS type imagers, within a mosaic of tiled FPA imagers and can be used to test different types of advanced material detectors or build a heterogeneous mosaic well suited for a variety of remote reconnaissance applications. This adaptability is due to using a dedicated control chip for each FPA imager in the tiled mosaic. This construct can serve as a precursor to a variety of full custom and application specific implementations of intelligent vision systems tailored to remote reconnaissance applications.

Embodiments of the invention can deliver real-time acquisition and tracking of multiple targets across multiple FPA imagers with data passing between SIC modules in space applications. Embodiments of the invention may be implemented as a field programmable gate array (FPGA)-based imager controller or a standalone FPGA platform using a network module to interconnect a plurality of controllers (e.g., four) to identify and track multiple, simultaneous targets. In addition, embodiments of the invention may use known processing algorithms for FPGA implementation. An example four-imager embodiment of the invention may be used in a highly integrated controller implementation for an intelligent, tiled FPA imager gigapixel sensor in space.

2. Smart Imager Cell Modules in Foveal Image Data Processing

As discussed above, apparatuses and methods for handling scene recognition from gigapixel imagery to enable autonomous, intelligent surveillance are disclosed. Gigapixel imaging systems are uniquely suited to long-range surveillance applications due to their unprecedented spatial resolution and wide field-of-view. By providing the means to process and interpret enormous quantities of data from tiled FPA imagers, embodiments of the invention enable and enhance application of gigapixel imaging systems for remote sensing. The end result is distilled data that can be used to infer what is taking place within a scene for autonomous situational awareness. This is directly applicable to remote reconnaissance applications.

Figure 1A:
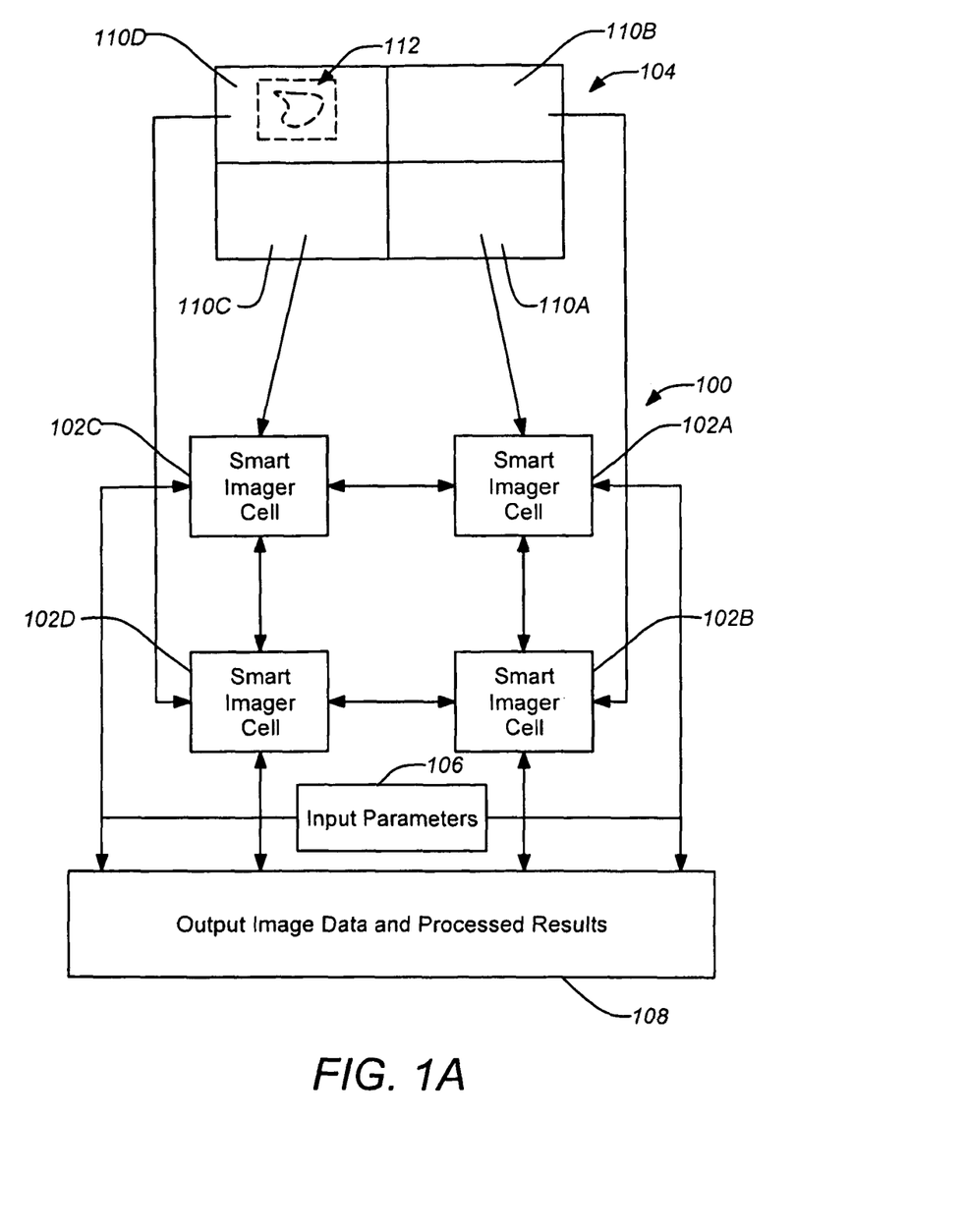
FIG. 1A is a schematic diagram of an exemplary image processing system embodiment of the invention.

FIG. 1A is a schematic diagram of an exemplary image processing system 100 embodiment of the invention. The example system 100 may be described comprising a plurality of imager nodes, referred to as smart imager cell (SIC) modules 102A-102D. The plurality of SIC modules 102A-102D together receive image data 104 for foveal processing. Foveal processing refers to digital processing of the image data 104 to identify regions of interest (ROI) 112 with target features and/or track these in the image data 104, e.g. from frame to frame in the moving image. Each of the SIC modules 102A-102D receive input parameters 106 directing the foveal processing through a local host interface and output image data 104 along with processed results to data storage 108. Importantly, the plurality of SIC modules 102A-102D are interconnected to each other to share the foveal processing of the image data 104.

The image data 104 may be generated from one or more focal plane array (FPA) imagers (not shown). In one example, each SIC module 102A-102D has its own dedicated FPA imager to generate different portions 110A-110D of the overall image data 104, each portion 110A-110D being directed to a different one of the plurality of SIC modules 102A-102D for foveal processing. Alternately, a large FPA imager (or any number of FPA imagers less than the number of SIC modules) with multiple output taps, one to each SIC module 102A-102D, may be used to similarly generate the overall image data 104 as will be understood by those skilled in the art.

Typically, each of the plurality of SIC modules 102A-102D includes one or more processors for detecting and tracking regions of interest within a portion of the image data and routing the portion of the image data to and from one or more interconnected adjacent SIC modules. It should be noted that the term "features in regions of interest" in the context of the present application refers generally to significant elements identified and tracked within image data as will be understood by those skilled in the art.

The example four-node system 100 can be described where each SIC module 102A-102D comprises an imager and its associated electronics for sensor adaptation. The SIC modules are interconnected in a two-dimensional network to provide scalability of the gigapixel sensor using tiled FPA imagers. The example four SIC module network can provide persistent multi-target acquisition and tracking. Each SIC module may adapt a legacy FPGA-based imager controller to a standalone FPGA platform augmented with a network module for data passing. In addition, embodiments of the invention may employ adapted existing image processing algorithms for embedded on-the-fly computation.

Example embodiments of the invention may be readily developed from commercially available components, e.g. digital IO camera, FPGA board, lenses and development software to implement a described SIC module system. For example, the VHDL code from the eye tracker camera FPGA board described above may be adapted for the system. Such code can provide the basic SIC architecture and includes much of the functionality needed for control of an applicable commercial camera.

The code for the embedded routing processor may be developed using known applicable software tools, such as the AccelDSP and System Generator design tools in addition to hand coding of VHDL code. The resultant code can then be integrated into the adapted VHDL control code from the eye tracker to provide a communication mechanism for node-to-node data sharing in the system.

Some existing image processing algorithms may be customized, e.g. in Matlab script, for embedded implementation into the FPGA containing the imager control and routing processor. The customized algorithms may then be converted into VHDL code, e.g. using AccelDSP, and integrated into the FPGA to implement the embedded processing modules. Simulated imagery may be used to test an example smart adaptive sensor system for multi-target tracking with a simulated scene in order to build a space-based system.

In one example system, the primary hardware components may include a large format FPA camera, e.g., an Apogee Ascent A16000 camera (16-megapixel format) with single ROI, binning and trigger capability, coupled to a standalone FPGA card for embedded processing, control and communications, e.g. a Spartan3A-3400 FPGA card, in order to form each SIC module node. Known software development tools can be used to migrate VHDL code previously developed for CCD imager control to the Spartan FPGA card with suitable revisions to accommodate the new FPGA I/O architecture and A16000 camera command suite.

Alternately, such embedded sensor adaptation can be applied to a single very large format, multi-tap FPA imager, such as Fairchild's 9216×9216 (i.e. 85 megapixel) device typically used for reconnaissance applications. This example FPA imager is built on a 5" wafer and has eight output taps. While it is possible to continue extending the size of single FPA imagers, this approach lacks the scalability for multi-gigapixel resolution due to limitation from such issues as yield, uniformity and even fragility of such a large device under dynamic loads. Embodiments of the present invention can circumvent these limitations with a modular organization and can leverage a large format FPA imagers by building a SIC module around such a device to extend the size of the mosaic focal plane to dimensions that will likely never be achieved with single FPA imagers.

Figure 1B:
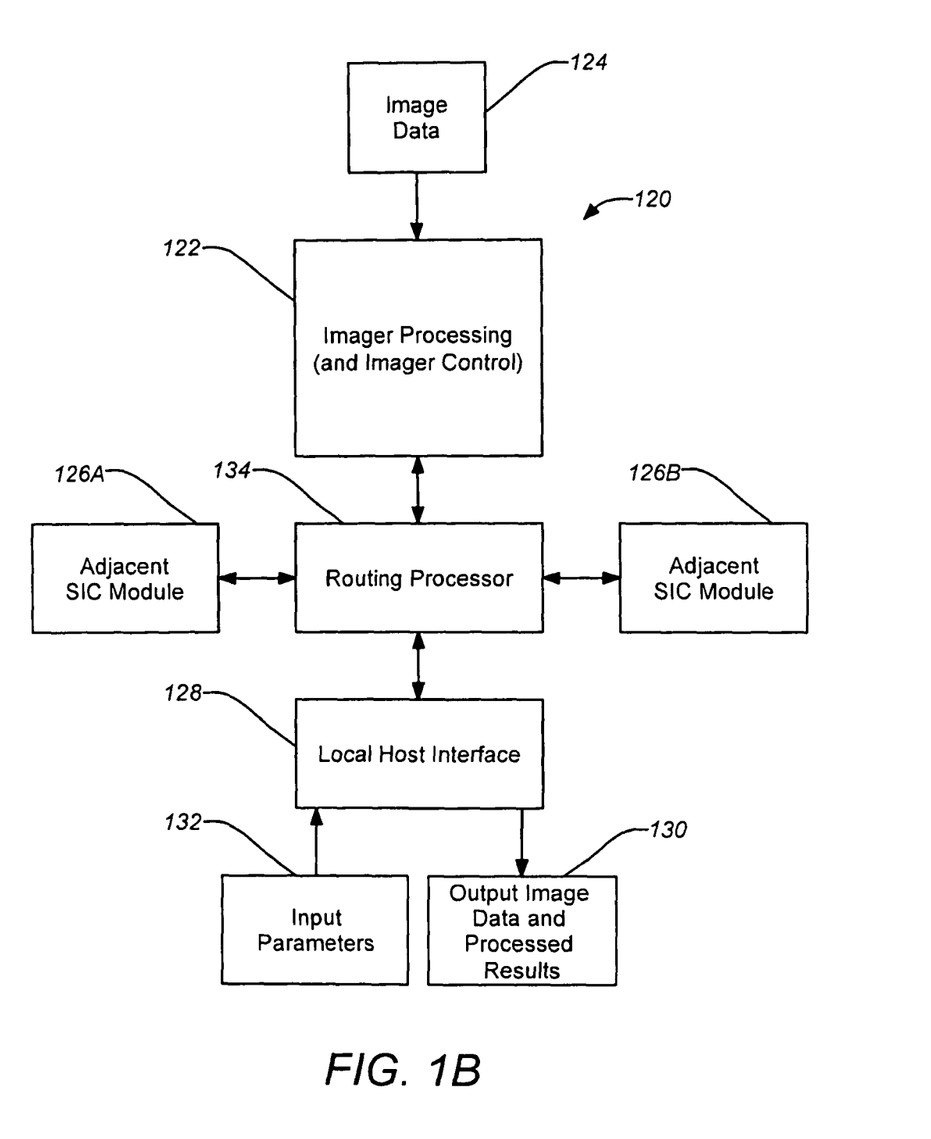
FIG. 1B is a schematic diagram of an exemplary smart imager cell (SIC) module and two adjacent SIC modules

FIG. 1B illustrates an exemplary smart imager cell (SIC) module 120, e.g. such as from the system 100 of FIG. 1A. The SIC module 120 includes one or more processors 122 for foveal processing of the received image data 124 (which may be a portion of the overall image data of a focal plane array). Optionally, some embodiments of the invention may implement control of an FPA imager as part of the SIC module, e.g. where each SIC module receives image data 124 from and directs control of a dedicated FPA imager. The SIC module also includes a routing processor 134 coupled to the foveal processor 122, which manages sending and receiving image data 124 between the foveal processor 122 and one or more adjacent SIC modules 126A, 126B of the network. In addition, the routing processor 134 is coupled to a local host interface that manages receiving input parameters 132 (e.g. to direct the foveal processing) and sending output image data 124 along with processed results (e.g. markers identifying features/regions of interest) to data storage 130 of the host. This local host link (to a host that is not necessarily "local") may be of limited bandwidth. It should be noted the different processing tasks (e.g. foveal processing, routing, local host interface, and FPA imager control) may be performed by any combination and type of processor as will be understood by those skilled in the art; processing tasks may be shared or performed by dedicated processors within the SIC module. In addition, the processors may be custom or programmable.

Each SIC module can provide persistent surveillance using a single imager. In a basic example network, four SIC modules can then be interconnected as four vertices of a square. The defined imaging system can be used to identify various target types of known trajectories as the data input to this example four-node platform. This example system can perform both localized imager control and node coordination between SIC modules for the persistent identification and tracking of multiple, simultaneous targets.

Figure 1C:
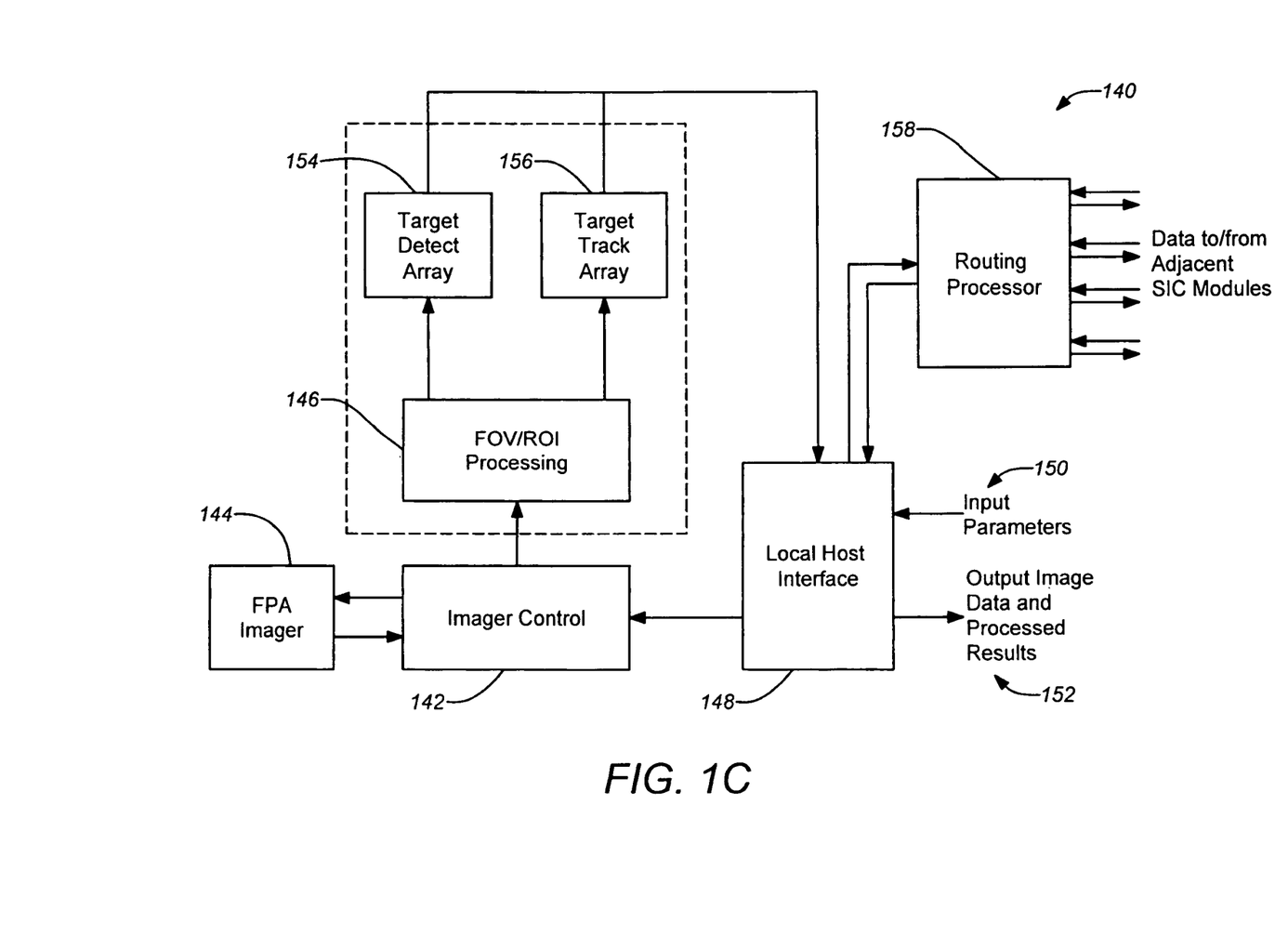
FIG. 1C is functional block diagram of an exemplary smart imager cell (SIC) module.

FIG. 1C is functional block diagram of an exemplary smart imager cell (SIC) module 140. This SIC module 140 is a more detailed example than the SIC module 120 of FIG. 1B. In this SIC module 140 an imager control processor 142 directs control of an FPA imager 144 and receives the raw image data. Input parameters (configuration information) 150 are received through the local host interface 148 and passed to the imager control processor 142. The imager control processor 142 directs the FPA imager 144 accordingly and the raw image data from the FPA imager 144 is then passed from the FPA imager 144 through the image control processor 142 on to the FOV/ROI pre-processor 146.

The example system 140 can provide coalescing circuitry for imager control, pixel data processing, feedback control and message passing. Input parameters 150 may be received at the local host interface 148 as high-level user input to the SIC module 140, and image data with target information 152 is then provided as the output to the user (or data storage). Input parameters 150 may specify either an entire field of view (FOV) scan for surveillance of new targets or definition of one or more regions-of-interest (ROI). The command sequence may be stored in a circular command buffer.

The command sequence may operate the FPA imager 144 to provide image data (pixel data) for the entire FOV or some combination of ROIs. Image data may be prefixed with ROI coordinates and passed to a preprocessing module to perform on-the-fly filter operations. The ROI coordinates, raw and preprocessed image data may then be output to systolic arrays for target class detection 154 or target tracking 156 as shown in FIG. 1C. These arrays can provide ROI coordinates, raw and preprocessed image data, and the target location(s) found within the image data. These data types may be input to feedback control logic built into the local host interface 148 and made available for user perusal as processed results 152 or to provide new commands for the circular command buffer based on targets identified. Any ROI with an identified target can result in a new command for an ROI centered on the target(s) returned to the imager control processor 142. Commands for readout of ROIs may be deleted from the buffer after capture of the ROI data. Commands for reading out the entire FPA imager 144 FOV may be automatically recycled back to the queue for persistent surveillance on a periodic basis.

The routing processor 158, in FIG. 1C, may be used to implement the example embodiment in the tiled FPA imager architecture. It can provide data passing between the SIC module 140 and its four adjacent SIC modules. The fundamental information that may be passed between SIC modules is ROI coordinates, size, data, and target type. The adjacent SIC modules use this priori knowledge to define an ROI without having searched for the target to enable migration of detected targets throughout the tiled gigapixel fabric without loss of tracking. This passing of information provides a natural mechanism for one SIC module to update the operation of its neighboring SIC modules based on target results.

Figure 1D:
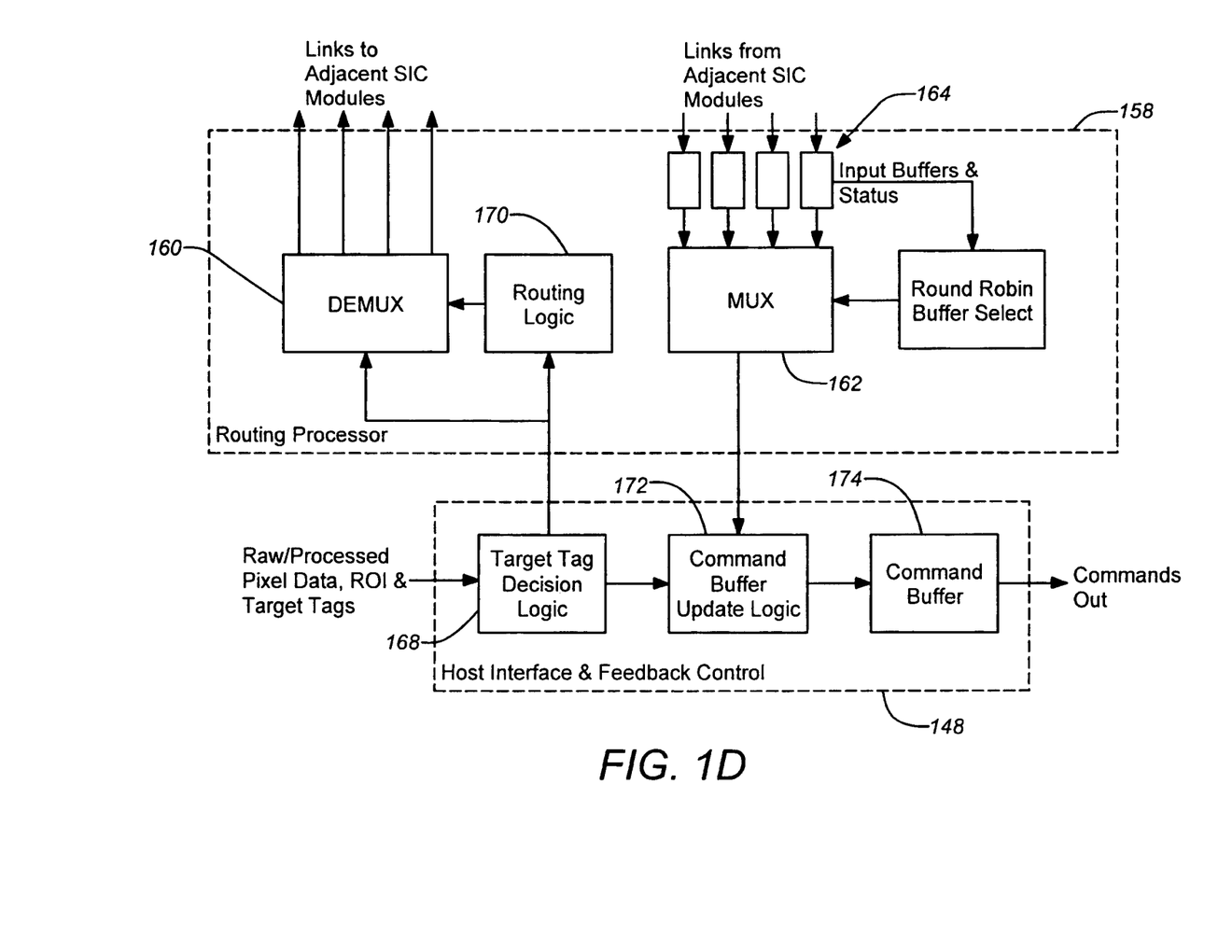
FIG. 1D is functional block diagram of an exemplary routing processor in a smart imager cell (SIC) module.

FIG. 1D is a detailed functional block diagram of an exemplary routing processor 158 in the smart imager cell (SIC) module 140 of FIG. 1C. The example routing processor 158 comprises a de-multiplexer (DEMUX) 160 and multiplexer (MUX) 162 combination and input buffer 164, shown in the FIG. 1D detailed block diagram of this logic within the dashed box and its interconnection to the local host interface 148 in FIG. 1C. The feedback control logic incorporated into the local host interface 148 comprises receiving raw processed image data including ROI/target tags (markers) from the target detect array 154 and target track array 156 in FIG. 1C into the target tag decision logic 168 in FIG. 1D. The target tag decision logic 168 passes selected image data and markers for adjacent SIC modules to routing logic 170 within the routing processor 158. The routing logic 170 passes this data to the DEMUX 160 directing selection of the appropriate adjacent SIC module to send it for further processing. The target tag decision logic 168 also passes selected image data and markers for the current SIC module 140 to the command buffer update logic 172 which also receives selected image data and markers from the MUX 162 of the routing processor 158. The command buffer update logic 172 combines these inputs and transfers them to the command buffer 174 to be sent to the FPA imager control logic 142 of FIG. 1C.

Variants of existing image processing algorithms can be modified for FPGA implementation and migrated into VHDL code. The algorithms can be integrated into the SIC module FPGA code as systolic arrays for feature identification and tracking to result in a SIC module for persistent surveillance using a single imager. Four copies of this SIC module may be implemented in a four-node system. This will require programming additional FPGA boards and building any custom cables for node-to-node connections. By interconnecting them via custom SIC module links a simple implementation of a 2D network communication fabric with a SIC node per vertex of the fabric and a data link to each of its two nearest neighbors. The mesh provides for "horizontal" communication between two node pairs and "vertical" communication within each node pair. By combining the 4-node system with simulated high-resolution imagery of known target types and trajectories on a monitor display, a system with 64-megapixel resolution can be implemented. This system can demonstrate (and validate) real-time acquisition and tracking of multiple targets.

Figure 2:
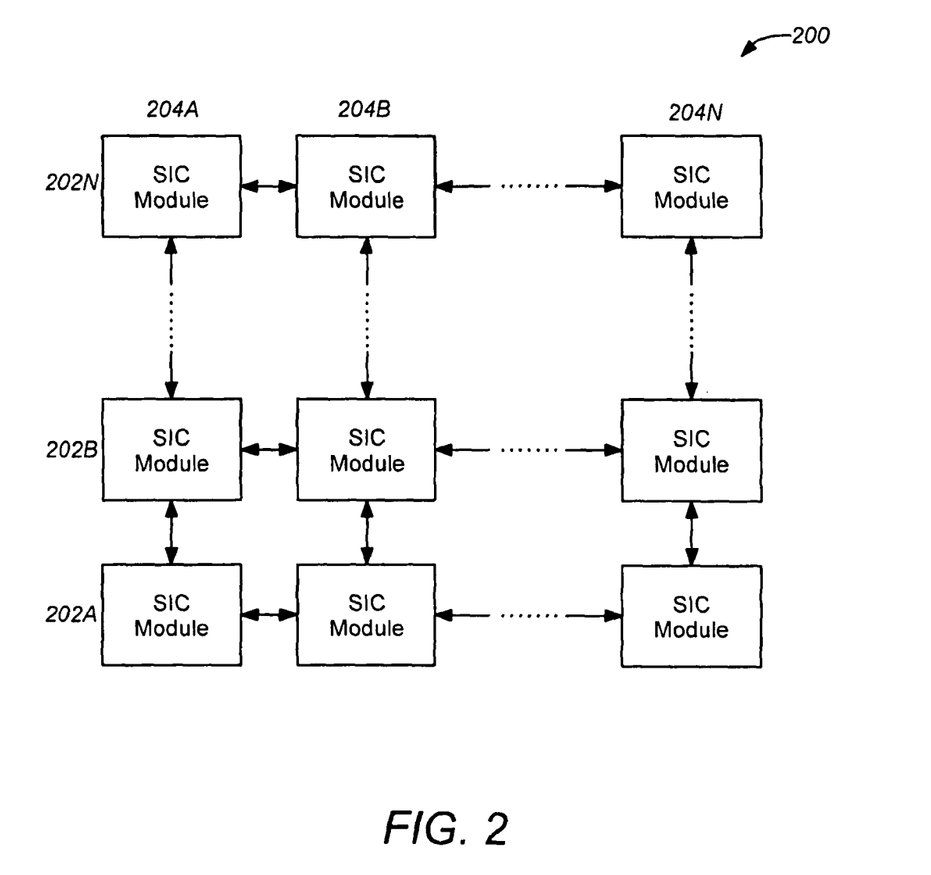
FIG. 2 illustrates an exemplary two dimensional network of SIC modules.

FIG. 2 illustrates an exemplary two dimensional network 200 of SIC modules. In this example, a two dimensional network 200 is formed from a plurality of SIC modules interconnected in a plurality of rows 202A, 202B ... 202N, and columns 204A, 204B ... 204N. In this network 200, each SIC module is either an interior SIC module (interconnected to four adjacent SIC modules), an edge SIC module (interconnected to three adjacent SIC modules) or a corner SIC module (interconnected to two adjacent SIC modules). Although other example embodiments of the invention of this shown comprising a simple four SIC module network (two rows and two columns), those skilled in the art will appreciate that embodiments of the invention may be developed using a plurality of SIC modules interconnected together in any known network form.

As described, embodiments of the present invention can provide low-level imager control (as the ResoLUT camera), but additionally resolve the control deficiencies by locally identifying targets of interest and autonomously feeding back these results to the control mechanism for on-the-fly sensor adaptation based on identified target dynamics. Embodiments of the present invention can also scale to a multi-gigapixel sensor by using a modular organization of tiled FPA imagers with sharing of target results across the mosaic for distributed control. These results can be used for a higher-level understanding as the scene evolves, which is not supported by conventional approaches. Embodiments of the present invention provide an architecture capable of supporting any number of focal plane array imagers at a scalable resolution limit (e.g., multi-gigapixel). In addition, embodiments of the invention can be implemented with embedded processing for autonomous control.

An example embodiment of the invention may adapt previously developed HDL code into a standalone FPGA board providing an order of magnitude more logic resources. New HDL code may be used to implement a routing processor and various image processing blocks within the standalone FPGA platform. This platform can be couple, e.g. via USB, to a camera to realize an example SIC module. Four such example SIC modules may be interconnected to implement a four-camera system.

Implementations of embodiments of the invention may be developed following typical system development processes, including system testing to identify technology gaps for both electronics and FPA imagers needed to realize a final system sensor in space. As understood by those skilled in the art, the specific challenges of the development can address FPGA resource constraints to implement embedded processing algorithms and integrate the routing processor and FPA controller for efficient sensor adaptation.

Typical tasks in developing an embodiment of the invention include defining the embedded communication module and embedding the processing algorithms to identify and track multiple targets across the tiled FPA imagers. The communication module is a novel component requiring standard design and testing across multiple SIC modules to implement. Under a methodology of periodically performing an acquisition scan over the entire FOV, the system can re-acquire any dropped targets whenever this scan occurs.

Typically, the embedded processing algorithms may require a fair amount logic real estate within the FPGA. To address this, an example FPGA board may comprise a 3.4 million gate Xilinx Spartan3A FPGA. The Spartan board has ten times the logic capacity of the legacy FPGA to mitigate this issue. In addition, targets may be limited in type and complexity to use simpler processing if necessary.

3. Image Data Processing for Identifying and Tracking

Using the system of SIC modules described above, embodiments of the invention may employ any suitable automated feature identification and/or tracking algorithm that can be programmed as understood by those skilled in the art. Some applicable examples of such algorithms have been previously developed.

For example, a non-contact eye tracker system for a hands-free computer interface was previously developed at JPL with advanced feature detection and tracking technology using embedded, real-time image processing to improve eye-tracking speed. The eye tracking system implements camera control and image processing in an FPGA for enhanced capability with fast ROI readout from a commercial charge coupled device (CCD) imager. The ROI discards unimportant areas of the image and transfers only desired pixel data for high rates. By implementing the time-intensive image processing in an FPGA, orders of magnitude faster processing are achieved compared to contemporary personal computers. The prior art eye tracking system includes the JPL-developed random access real-time, event-driven (RARE) camera (comprising the CCD interface board and programmable logic card), a custom infrared pulsed illuminator for scene lighting, steering mirror assembly for FOV panning and a commercial personal computer (PC) for system control and user interface.

The described RARE camera allows for the adjustment of ROI size, location, and scale (resolution) on a per frame basis for high frame rates using a conventional CCD. This mode of operation required the development of a customized local CCD controller to provide a tightly coupled mechanism for imager operation. Configuration of the local controller is handled by a commercial PC, which loads initialization and tracking parameters into the controller to define the imager operation.

The image processing functionality is implemented in portions of the RARE camera FPGA firmware, with some post-processing operations performed in the PC. An innovative image processing algorithm is matched to the natural readout order of pixels from CCD devices—each row of pixels in the image is processed as the pixel output stream is read out to locate likely edges of the pupil and corneal reflection. This list of candidate edges is processed to eliminate false alarms and missed edges. The refined list of edges is used to locate the pupil and corneal reflection centers within the image. The technique may be further optimized for speed and lean memory requirements. By embedding the described parallel processing capability of embodiments of the present invention in the RARE camera, better than an order of magnitude increase in processing speed for the eye tracker compared to conventional serial processing can be achieved.

Image processing within an embodiment of the invention may employ any known technique for identifying and/or tracking features in image data. In one example, a slice-based image processing technique may be used to leverage the RARE camera CCD's fast acquisition rate of image row slices for a highly optimized eye tracking system. In this approach, horizontal image slices are determined that contain the pupil and cornea using a robust one-dimensional canny edge detector. The gray value at each pixel, fused with its edge magnitude, is used to mask out pixels in the slice and result in a reduced processing for dramatic increases in processed data throughput.

More generalized moving object tracking can also apply a technique to detect and track moving objects using dense optical flow computation at every pixel. The displacement at every pixel is computed, and a robust estimator is used to distinguish outlier motion due to moving objects from motion of camera displacements and vibrations. While more computationally intensive, this technique offers an alternate solution to track smaller objects (or distant objects) that may not be detected by a sparse tracker. These known moving object detection and tracking algorithms can be further modified to provide a robust and accurate surveillance system with a gigapixel sensor.

Figure 3A:
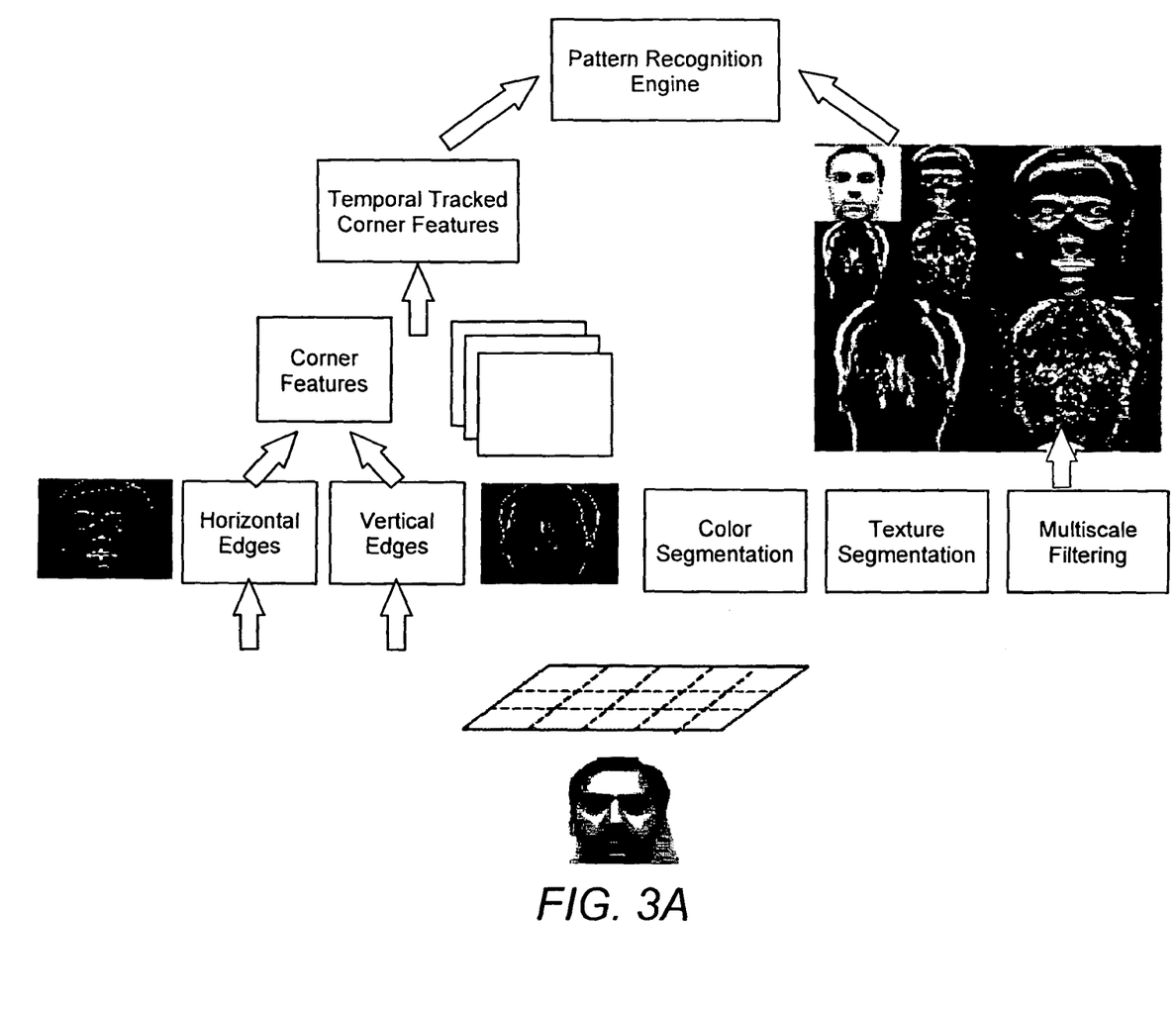
FIG. 3A illustrates a hierarchical flowchart of example image processing for recognition implemented in an embodiment of the invention.

FIG. 3A illustrates a hierarchical flowchart of example image processing for recognition implemented in an embodiment of the invention. The identification and tracking algorithms for embodiments of the invention may operate in a three-dimensional stack, with the raw image data at the bottom that flows up to higher layers of the stack after further processing. This is similar to a systolic array on the whole image matrix, a neck-breaking performance approach that steps the clock at orders of magnitude rate lower than pixel-based pipeline approaches and even FPGAs standard implementations.

Target detection and tracking application from remote satellite gigapixel image data may be applied to the described image processing. A multi-target detection module may use an efficient nonlinear correlation design that ensures improved robustness without compromising on computation speed for real-time operation. A nonlinear correlator may be based on the maximum representation and discrimination feature classifier that uses a "learning" phase where the optimal correlator and its parameters are trained with pre-stored library training samples for each target type. After the correlator is trained, it can be deployed on the real-time gigapixel image processing hardware. The processing handles in-plane rotations of targets, in cases where embodiments of the present invention involve remote satellite imaging with a "look-down" view. A correlator for a range of contiguous angles, e.g. 0 to 15 degrees, and another one for the next 15 degrees, 16-30 degrees, can be employed to overcome this issue. The detection phase may therefore require extensive computation to handle detection under a wide variation of angles and noise levels.

Figure 3B:
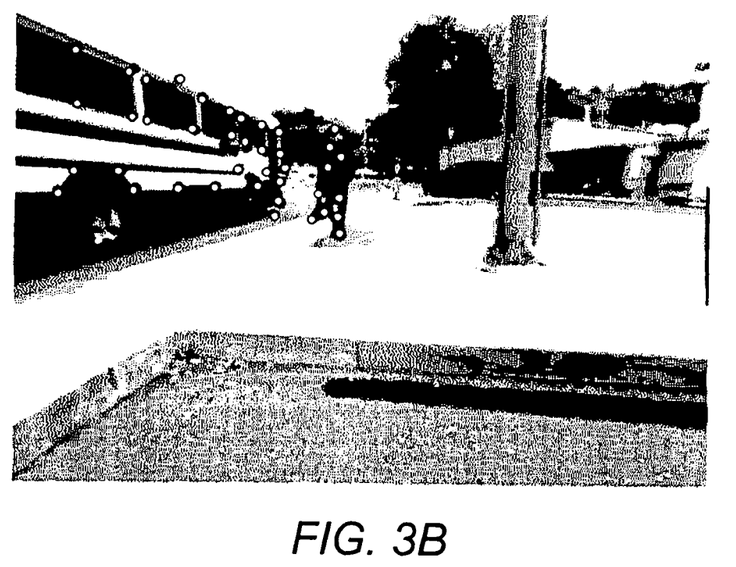
FIGS. 3B & 3C are example sequential images illustrating detected features tracked over time.
Figure 3C:
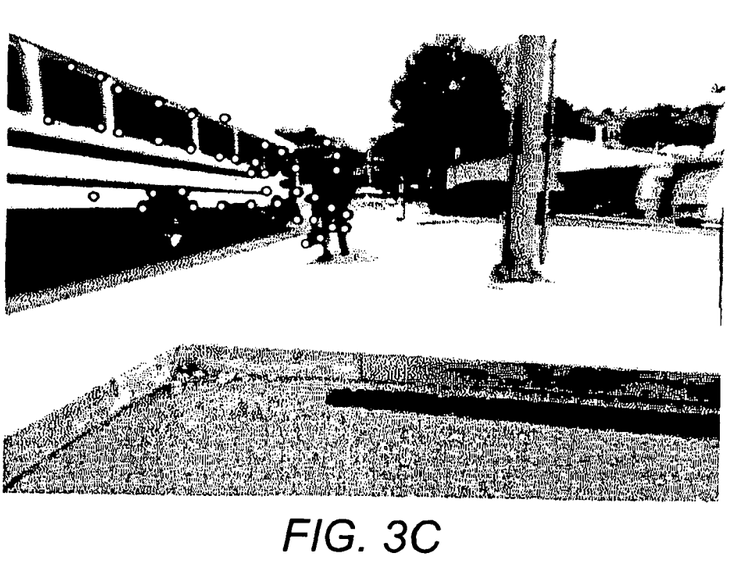

FIGS. 3B & 3C are example sequential images illustrating detected features tracked over time. A example tracking module may be used to maintain lock on a target after detection. In sequential FIGS. 3B & 3C, the identified target points stay locked onto the detected features from one image to the next by using a robust, multiscale corner-based feature detection and tracking technique known in the art. The example algorithm is a variant of the Lucas-Kanade feature tracker that detects and tracks salient corners of target moves as known in the art. Low texture regions may contain insufficient information for tracking but corners are well-preserved features as a rigid object moves and are easier to track. Existing computer vision image-based dense and sparse feature detection and tracking techniques may be applied in the described image processing system as will be appreciated by those skilled in the art. As an example, the capability to track features in images at 70 Hz has been previously demonstrated estimating six DOF motion from visual data or visual odometry from feature tracking at 20 Hz. This technology may be applied to embodiments of the invention for surveillance and monitoring of remote areas by automated tracking of detected targets. Existing feature tracking solutions, e.g. in FIGS. 3B & 3C, may be extended to detect and track, and extract ROIs for targets from the gigapixel image, and relay only the ROI image subsets back to the central command center for further analysis in embodiments of the present invention.

4. Exemplary Applications

Currently developed technology can readily provide basic imager control as part of an example embodiment of the invention with some image-specific pre-processing embedded in the control logic. Additional image processing, the feedback control (for imager adaptation) and a routing processor may be needed to implement a full tiled mosaic of coordinated sensors. Example embodiments of the invention can incorporate the additional functionality into the embedded control mechanism for a basic four sensor system, e.g. 4-nodes tiled for a 64 megapixel sensor providing a full scene scan at least once every 10 seconds using decimated imagery with persistent tracking of up to 16 simultaneous targets where the targets are imaged at full sensor resolution.

Embodiments of the present invention can address many image recognition objectives by not only developing a gigapixel sensor through modular construction, but also by alleviating the data bottleneck through intelligent filtering of the data at the sensor for dramatic data reduction. Application-specific operations at the sensor can extract useful information by providing the capability of unsupervised scene evaluation with only pertinent data results sent back to ground based operations for rapid command and control decisions. Embodiments of the invention can be applied to the general reconnaissance interests of detecting, locating, characterizing and tracking air and ground moving targets and single entities. Embodiments of the invention can additionally be applied to provide automated intelligent data gathering and persistent surveillance, particularly to rapidly survey wide fields of view while simultaneously collecting data on multiple targets. In addition, embodiments of the invention can be applied to provide real-time or near real-time image data processing and dissemination of information.

Some specific application can include an aircraft based system where space and power are not at a premium. Embodiments of the invention can also be integrated into various ultra-high resolution imaging instruments for space-based systems. Further, the embedded image processing may be modified for specific targets of interest integrated into an existing aircraft platform and/or a space-based, tiled gigapixel sensor.

Embodiments of the invention also have application to automated identification systems for law enforcement due to the capability to decimate the image data by performing vertical and horizontal binning. Embodiments of the invention can also be operated in a low-resolution mode until some feature of interest is identified. After identification, the extracted feature can be viewed with the full sensor resolution to see details not available in the decimated data.

5. Method of Data Processing

Embodiments of the invention also encompass a method of image processing consistent with the foregoing described systems and apparatuses. The method describes parallel processing using smart imager cell modules. The smart imager cell modules share detecting and tracking of regions of interest within received image data by routing portions of the image data from one module to adjacent other modules as it is being analyzed.

Figure 4:
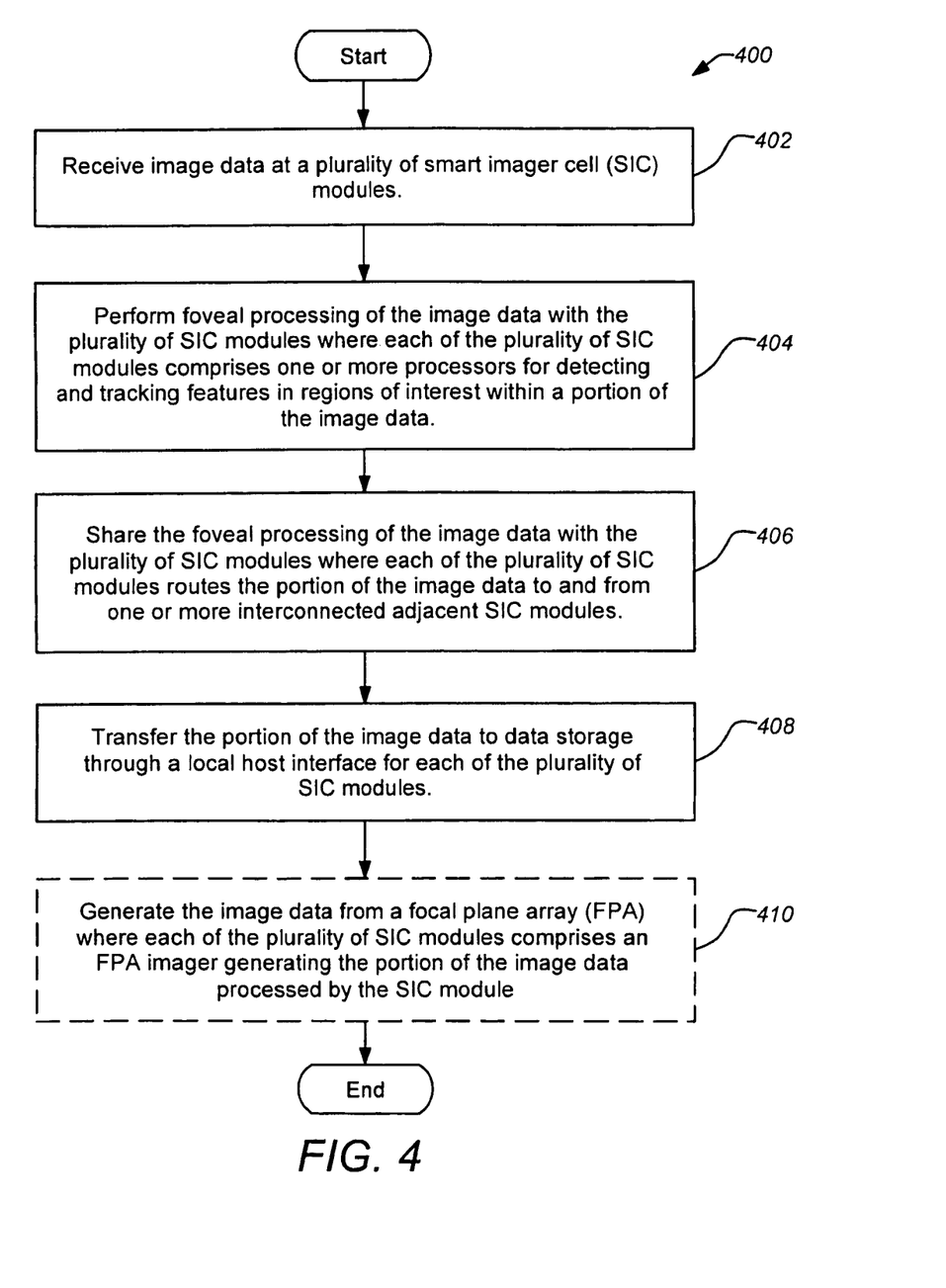
FIG. 4 is a flowchart of an exemplary method of image processing in accordance with an embodiment of the invention.

FIG. 4 is a flowchart of an exemplary method 400 image processing. The method 400 begins with an operation 402 of receiving image data at a plurality of smart imager cell (SIC) modules. Next, in operation 404, foveal processing of the image data is performed with the plurality of SIC modules where each of the plurality of SIC modules comprises one or more processors for detecting and tracking features in regions of interest within a portion of the image data. In operation 406, the foveal processing of the image data is shared with the plurality of SIC modules where each of the plurality of SIC modules routes the portion of the image data to and from one or more interconnected adjacent SIC modules. Finally in operation 408, the portion of the image data is transferred to data storage through a local host interface for each of the plurality of SIC modules. The method 400 may be further enhanced through optional operations consistent with the apparatuses and systems described in the foregoing sections. For example, in optional operation 410, the image data may be generated from a focal plane array (FPA) where each of the plurality of SIC modules comprises an FPA imager generating the portion of the image data processed by the SIC module.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for image processing, comprising:
a plurality of smart imager cell (SIC) modules receiving and foveal processing of image data, the plurality of smart imager cell modules interconnected to each other to share the foveal processing of the image data, each of the plurality of SIC modules comprising:
one or more processors for detecting and tracking regions of interest within a portion of the image data and routing the portion of the image data to and from one or more interconnected adjacent SIC modules; and
a local host interface for transferring the portion of the image data to data storage;
wherein the image data is generated from a focal plane array (FPA) where each of the plurality of SIC modules comprises an FPA imager generating the portion of the image data and wherein the one or more interconnected adjacent SIC modules correspond to adjacent portions of the FPA.

2. The apparatus of claim 1, wherein the plurality of SIC modules are interconnected in a two dimensional network.

3. The apparatus of claim 2, wherein the two dimensional network comprises the plurality of SIC modules interconnected in a plurality of rows and a plurality of columns.

4. The apparatus of claim 1, wherein detecting and tracking features in regions of interest within the portion of the image data comprises generating markers for detected features of the portion of the image data and the markers are transferred to the data storage.

5. The apparatus of claim 1, wherein the one or more processors control the FPA imager for each of the plurality of SIC modules in response to the detecting and tracking features in regions of interest within the portion of the image data.

6. The apparatus of claim 1, wherein at least one of the plurality of SIC modules comprises a different type FPA imager from the others.

7. The apparatus of claim 1, wherein the plurality of SIC modules are programmable receiving input parameters through the local host interface for directing control of the one or more processors.

8. The apparatus of claim 7, wherein the input parameters direct detecting and tracking the features in regions of interest within the portion of the image data.

9. The apparatus of claim 7, wherein the one or more processors comprise one or more field programmable gate arrays (FPGAs).

10. A method of image processing, comprising:
receiving image data at a plurality of smart imager cell (SIC) modules;
foveal processing of the image data with the plurality of smart imager cell (SIC) modules where each of the plurality of SIC modules comprises one or more processors for detecting and tracking features in regions of interest within a portion of the image data;
sharing the foveal processing of the image data with the plurality of SIC modules where each of the plurality of SIC modules routes the portion of the image data to and from one or more interconnected adjacent SIC modules;
transferring the portion of the image data to data storage through a local host interface for each of the plurality of SIC modules; and
generating the image data from a focal plane array (FPA) where each of the plurality of SIC modules comprises an FPA imager generating the portion of the image data and wherein the one or more interconnected adjacent SIC modules correspond to adjacent portions of the FPA.

11. The method of claim 10, wherein the plurality of SIC modules are interconnected in a two dimensional network.

12. The method of claim 11, wherein the two dimensional network comprises the plurality of SIC modules interconnected in a plurality of rows and a plurality of columns.

13. The method of claim 10, further comprising generating the image data from a focal plane array (FPA) where each of the plurality of SIC modules comprises an FPA imager generating the portion of the image data.

14. The method of claim 13, wherein detecting and tracking features in regions of interest within the portion of the image data comprises generating markers for detected features of the portion of the image data and the markers are transferred to the data storage.

15. The method of claim 13, wherein the one or more processors control the FPA imager for each of the plurality of SIC modules in response to the detecting and tracking features in regions of interest within the portion of the image data.

16. The method of claim 13, wherein at least one of the plurality of SIC modules comprises a different type FPA imager from the others.

17. The method of claim 10, wherein the plurality of SIC modules are programmable receiving input parameters through the local host interface for directing control of the one or more processors.

18. The method of claim 17, wherein the input parameters direct detecting and tracking the features in regions of interest within the portion of the image data.

19. The method of claim 17, wherein the one or more processors comprise one or more field programmable gate arrays (FPGAs).

20. An apparatus for image processing, comprising:
a plurality of smart imager cell (SIC) modules receiving and foveal processing of image data, the plurality of smart imager cell modules interconnected to each other to share the foveal processing of the image data, each of the plurality of SIC modules comprising:
a processing means for detecting and tracking features in regions of interest within a portion of the image data;
a routing means for transferring the portion of the image data to and from one or more interconnected adjacent SIC modules; and
a local host interface means for transferring the portion of the image data to a data storage means for storing the portion of the image data;
wherein the image data is generated from a focal plane array (FPA) where each of the plurality of SIC modules comprises an FPA imager means for generating a portion of the image data and wherein the one or more interconnected adjacent SIC modules correspond to adjacent portions of the FPA.

21. The apparatus of claim 20, wherein detecting and tracking features in regions of interest within the portion of the image data comprises generating markers for detected features of the portion of the image data and the markers are transferred to the data storage means.

22. The apparatus of claim 20, wherein the one or more processors control the FPA imager for each of the plurality of SIC modules in response to the detecting and tracking features in regions of interest within the portion of the image data.

* * * * *